United States Patent
Jonath et al.

(10) Patent No.: US 9,779,367 B2
(45) Date of Patent: Oct. 3, 2017

(54) SYSTEM, METHOD AND COMPUTER PROGRAM PRODUCT FOR GENERATING KEY PERFORMANCE INDICATORS IN A BUSINESS PROCESS MONITOR

(75) Inventors: Michael Adam Jonath, Oakland, CA (US); Michelle Ju-Yu Yen, San Francisco, CA (US); Donna Tellam, Superior, CO (US); James Boe, Denver, CO (US)

(73) Assignee: Software AG USA, Inc., Reston, VA (US)

( * ) Notice: Subject to any disclaimer, the term of this patent is extended or adjusted under 35 U.S.C. 154(b) by 1661 days.

(21) Appl. No.: 11/896,287

(22) Filed: Aug. 30, 2007

(65) Prior Publication Data

US 2009/0063221 A1     Mar. 5, 2009

(51) Int. Cl.
    *G06Q 10/06* (2012.01)

(52) U.S. Cl.
    CPC ....... *G06Q 10/06* (2013.01); *G06Q 10/06393* (2013.01)

(58) Field of Classification Search
    None
    See application file for complete search history.

(56) References Cited

U.S. PATENT DOCUMENTS

| | | | |
|---|---|---|---|
| 6,633,878 B1* | 10/2003 | Underwood | |
| 7,443,282 B2* | 10/2008 | Tu et al. | 340/10.1 |
| 7,660,702 B2* | 2/2010 | Blight | G06F 11/3495 |
| | | | 702/186 |
| 7,792,886 B2* | 9/2010 | Hadari et al. | 707/790 |
| 2002/0116213 A1* | 8/2002 | Kavounis et al. | 705/1 |
| 2003/0187675 A1* | 10/2003 | Hack et al. | 705/1 |
| 2003/0191679 A1* | 10/2003 | Casati | G06Q 10/109 |
| | | | 705/7.12 |
| 2004/0102926 A1* | 5/2004 | Adendorff et al. | 702/182 |
| 2004/0138944 A1* | 7/2004 | Whitacre et al. | 705/11 |
| 2004/0260582 A1* | 12/2004 | King et al. | 705/7 |
| 2004/0260591 A1* | 12/2004 | King | G06Q 10/06 |
| | | | 705/7.28 |
| 2005/0171833 A1* | 8/2005 | Jost et al. | 705/10 |
| 2007/0233728 A1* | 10/2007 | Puteick et al. | 707/103 R |
| 2008/0172287 A1* | 7/2008 | Tien et al. | 705/10 |

FOREIGN PATENT DOCUMENTS

| | | |
|---|---|---|
| EP | 1 515 257 | 3/2005 |
| EP | 1 788 517 | 5/2007 |

\* cited by examiner

*Primary Examiner* — Thomas L Mansfield, Jr.
(74) *Attorney, Agent, or Firm* — Venable LLP; Jeffri A. Kaminski

(57) ABSTRACT

A system, method and computer program product to enable graphical modeling of business processes. KPIs may be defined as part of the design procedure of forming the process. Once defined, the definitions of the KPIs may be included in deployable units and provided to a runtime environment.

29 Claims, 4 Drawing Sheets

SYSTEM, METHOD AND COMPUTER PROGRAM PRODUCT FOR GENERATING KEY PERFORMANCE INDICATORS IN A BUSINESS PROCESS MONITOR

BACKGROUND OF THE INVENTION

The present invention is related generally to business process monitoring systems, and more particularly to a system, method and computer program product for generating key performance indicators ("KPIs") in a business process monitor.

In the past, modeling of business processes and defining of KPIs had been limited to the use of fixed system-level KPIs. A business analyst would define such KPIs, and the fixed system-level KPIs would be individually coded. It would be much more desirable to enable graphical modeling of such business processes in which KPIs may be defined as part of the design procedure of forming the process. Once defined, the definitions of the KPIs may be included in deployable units and provided to a runtime environment.

BRIEF DESCRIPTION OF THE DRAWINGS

Embodiments of the invention will now be described in connection with the associated drawings, in which.

DETAILED DESCRIPTION OF THE INVENTION

Figure 1:
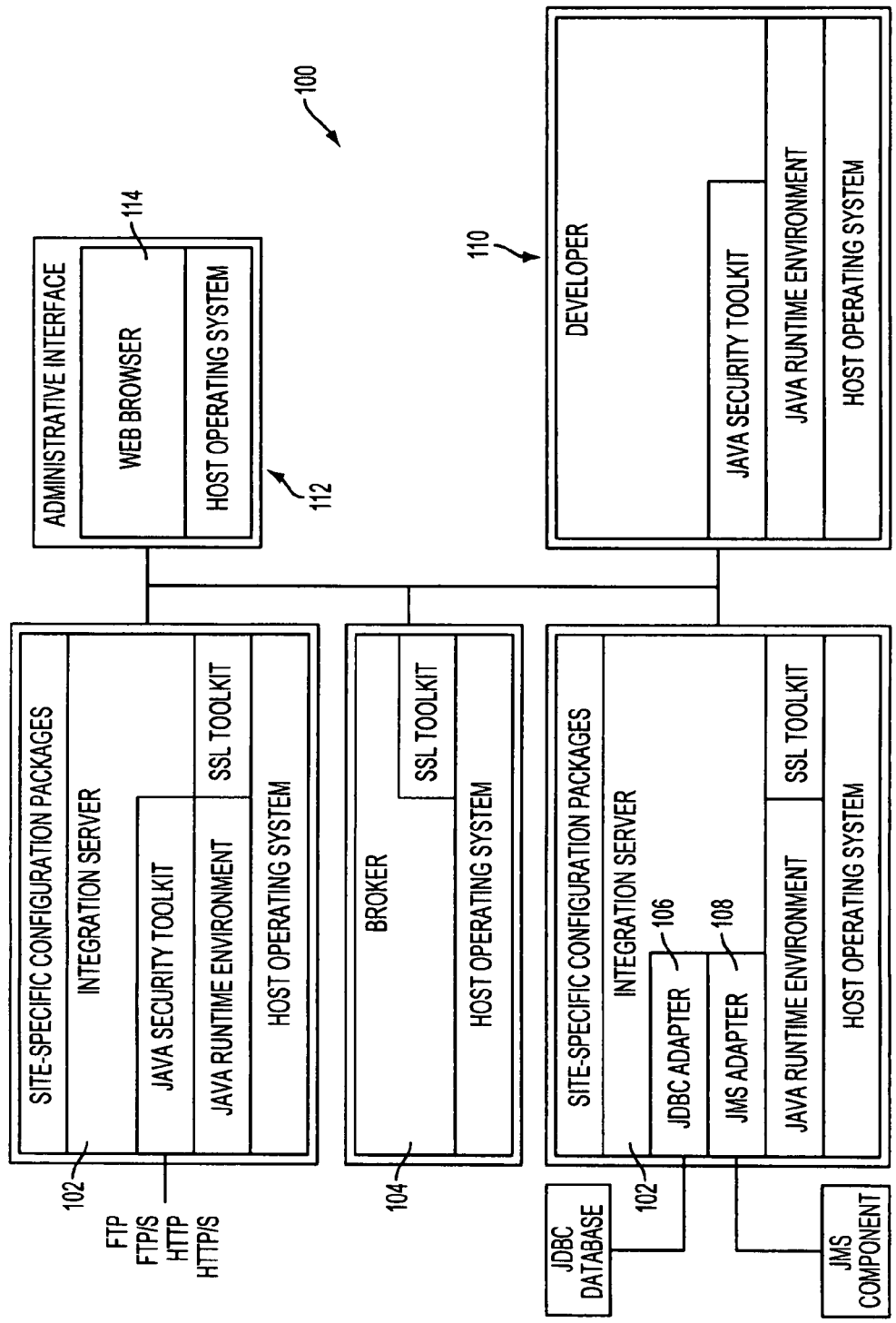
FIG. 1 depicts a block diagram of an integration suite for use in a business process management system according to the present invention.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

In the following description and claims, the terms "computer program product" and "computer readable medium" may be used to generally refer to media such as, e.g., but not limited to a removable storage drive, a hard disk installed in a hard disk drive, and signals, etc. These computer program products may provide software to a computer system. The invention may be directed to such computer program products and computer readable media.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Referring now to the drawings, wherein like reference numerals and characters represent like or corresponding parts and steps throughout each of the several views, there is shown in FIG. 1 a computer-based system business process integration suite that delivers the real-time automation.

Integration suite 100 is made up of components to design, execute, and manage integration solutions. Components fall into three basic categories: run-time components, including an integration server 102, broker 104, and adapters (e.g., JDBC and JMS adapters 106, 108), design-time components 110, which provide tools for developing and testing integration solutions (e.g., webMethods Developer), and administrative and monitoring interfaces 112, including a web browser 114.

Integration server 102 may comprise webMethods Integration Server, Version 6.5, Service Pack 2, which is the platform's central run-time component and the primary engine for the execution of integration logic. It is the main entry point for the systems and applications. An extensive library of built-in services installed with the integration server 102.

Integration server 102 plays the following key roles. First, it hosts adapters such as adapters 106, 108, which are special modules that link the back-end resources to the integration suite 100. Adapters interact directly with the integrated applications and systems. A single integration server 102 may host zero or more adapters. In the embodiment shown in FIG. 1, the integration suite 100 includes two adapters, one for JDBC (to Oracle, Microsoft SQL Server, or other database servers) and one for JMS.

Integration server 102 also serves as a business-to-business gateway, and is the external interface between the integration suite 100 and systems outside the enterprise. It provides the underlying support for transporting and encoding business documents using the open standards of the Internet. In the embodiment shown in FIG. 1, the integration suite 100 supports the application protocols HTTP, HTTP/S, FTP, and FTP/S. However, in general, it may host modules that provide support for other standards including e-commerce standards such as EDI, RosettaNet, and ebXML.

Integration server 102 further executes integration logic. Integration logic is housed in units called services. Integration server 102 performs the work of retrieving data from one resource and delivering it to another by executing integration logic. Services are also used to perform administrative functions, such as adding a new user or configuring a new HTTP port.

Integration server 102 also provides access control mechanisms, which collectively restrict access to services, folders, and ports based on the groups to which users belong, their IP address and their credentials. The access control mechanisms are implemented both on the TCP port the user accesses the integration suite 100 through and the resource the user is attempting to access. Access to a port is controlled both through the presumed IP address and the integration server service. Access to the integration server 102 resources is controlled at the group level.

An authorized administrator is able to point an HTML-based browser at any integration server 102 in order to manage the server and its functions remotely. The administrator interface 112 is used by authorized users to:

Maintain the client certificate store;

Create the integration server users' accounts (and passwords), user groups and access control lists of user groups. User accounts are assigned to the appropriate groups by the authorized administrator;

Set IP connection level security. The authorized administrator may define a list of IP addresses and domain names that may access the integration suite 100 through a configured port. IP addresses and domain names may contain wildcards.

Set service connection level security. The authorized administrator may define a list of services that are permitted for a given configured port. Services may contain wildcards. This capability does not extend to other integration server resources such as server pages.

Set service level security. The authorized administrator may define a list of users that are permitted access to an installed service.

Access a broker administrator interface through the integration server 102 if the Broker Administrator package has been installed on the integration server 102.

Further details regarding integration server 102, and in particular webMethods Integration Server, Version 6.5, Service Pack 2, may be found in *webMethods Integration Server Administrator's Guide*, Version 6.5, Service Pack 2 (December 2006), *webMethods Integration Server Built-In Services Reference*, Version 6.5, Service Pack 2 (December 2006), and *webMethods Installation Guide*, FABRIC 7 (May 2007), each of which is incorporated herein by reference.

The role of broker 104, in turn, is to route documents between information producers (i.e., "publishers") and information consumers (i.e., "subscribers"). In the integration suite 100 shown in FIG. 1, integration servers 102 function as both publishers and subscribers. They interact with the broker 104 using a proprietary protocol.

Broker 104 is a high-speed message router. It is the primary component of what is generally referred to as the platform's "message backbone" or "message facility." Along with supporting features provided by the other components, broker 104 facilitates asynchronous, message-based solutions using the publish-and-subscribe model.

The publish-and-subscribe model is a specific type of message-based solution in which resources exchange messages (carrying documents) anonymously through a message broker. Under this model, applications that produce information make that information available in specific types of documents that they publish to a broker. Applications that require information subscribe to the specific types of documents that they need.

Broker 104 maintains a list of subscribers that are interested in receiving certain types of documents. When a component publishes a document, broker 104 queues the document for the subscribers of that particular document type. When a subscriber receives a document from its queue, an action is triggered on the subscriber's system that processes the document.

While the configuration shown in FIG. 1 contains a single broker 104, it should be understood that integration suite 100 may contain multiple brokers that operate in groups called territories. Further details regarding broker 104, and in particular webMethods Broker, Version 6.5.2, may be found in *webMethods Installation Guide*, FABRIC 7 (May 2007), *webMethods Broker Administrator's Guide* 6.5.2 (2006), *webMethods Broker Administrator C API Programmer's Guide* 6.5.2 (2006), *webMethods Broker Administrator Java API Programmer's Guide* 6.5.2 (2006), *webMethods Broker Client ActiveX COM API Programmer's Guide* 6.5.2 (2006), *webMethods Broker Client C API Programmer's Guide* 6.5.2 (2006), and *webMethods Broker Client Java API Programmer's Guide* 6.5.2 (2006), each of which is incorporated herein by reference.

Adapters 106, 108 also run on the integration server 102. They connect the back-end resources in an enterprise (e.g., a customer database, a Human Resources application, an inventory system) to the integration suite 100. The nature of the connection created through an adapter is that the integration server 102 plays the role of client and initiates all transactions with the back-end resource.

Such adapters handle the low-level work of connecting to the resource, managing communications, encoding and decoding data, and invoking processes via the resource's API, thus allowing the incorporation of a resource in an integration solution without having to build complex custom code or understand the low-level details of the resource or its application protocol.

Integration server 102 requires an adapter for each type of resource with which it interacts. While the integration suite 100 may provide adapters for a broad range of databases and business systems, the embodiment shown in FIG. 1 contains adapters for JDBC and JMS only.

Developer 110 is a graphical development tool that an authorized administrator uses to build, edit, and test integration logic. It provides an integrated development environment in which to develop the logic and supporting elements that carry out the work of an integration solution. It also provides tools for testing and debugging solutions.

Developer 110 lets an authorized administrator rapidly construct integration logic with an implementation language that provides a set of simple but powerful constructs that an authorized administrator uses to specify a sequence of actions (or "steps") that the integration server 102 will execute at run time. Coupled with the developer's graphical user interface and its drag-and-drop data mapping capability, this allows an authorized administrator to quickly develop integration logic without low-level coding.

Although an authorized administrator may implement most integration solutions using this implementation language and the integration server's library of built-in services, an authorized Administrator can also build services using Java, C/C++, or Visual Basic (or any other COM/DCOM-based component) if the solution requires specialized integration logic that the integration suite 100 does not provide. Further details regarding developer 110, and in particular webMethods Developer, Version 6.5, Service Pack 3, may be found in *webMethods Installation Guide*, FABRIC 7 (May 2007), *webMethods Developer User's Guide*; Version 6.5, Service Pack 3 (December 2006), *webMethods Integration Server Built-In Services Reference*, Version 6.5, Service Pack 2 (December 2006), and *Publish-Subscribe Developer's Guide*, Version 6.5, Service Pack 3 (December 2006), each of which is incorporated herein by reference.

In the embodiment shown in FIG. 1, two instances of webMethods Integration Server 6.5 and adapters are running on a two separate machines, while webMethods Broker 6.5 is running on a separate machine. For these purposes, all three machines may be Intel or compatible hardware running a Microsoft Windows Operating System (OS). The integration server systems may use the IBM 1.3.1 Java run-time environment (JRE).

Figure 2A:
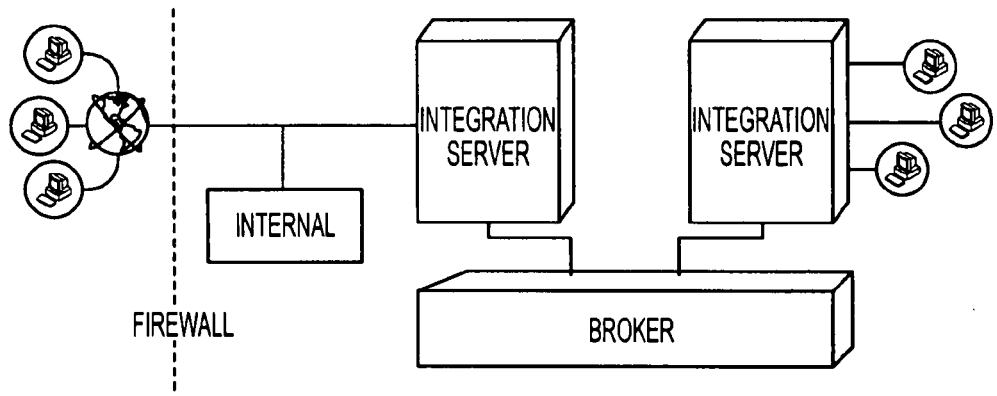
FIGS. 2A, 2B, and 2C depict alternative embodiments of the integration suite shown in FIG. 1.
Figure 2B:
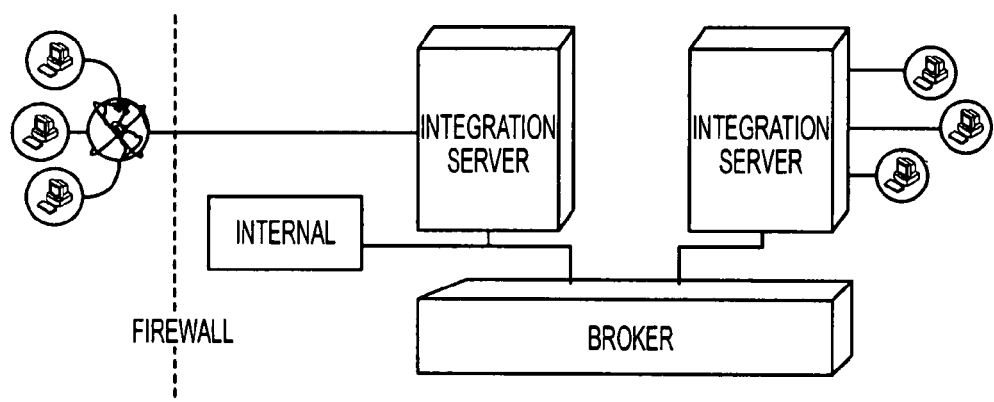
Figure 2C:
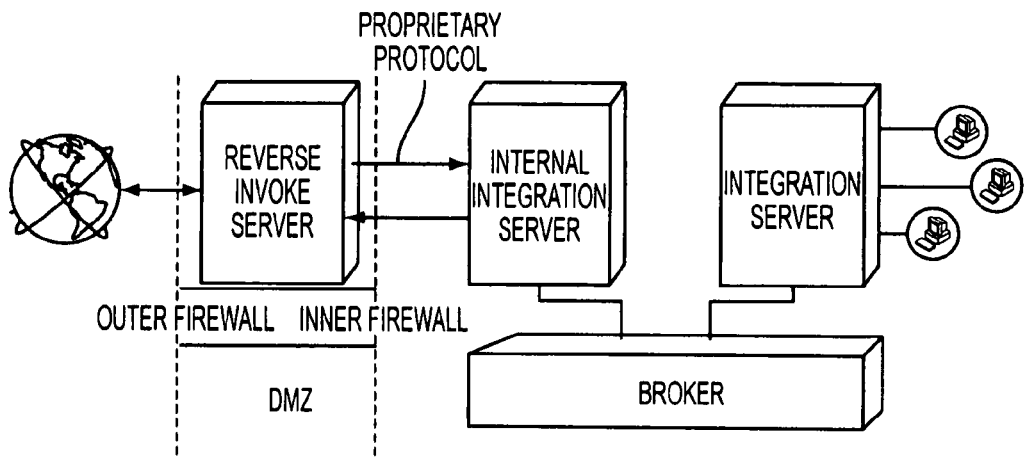

Other configurations of the integration suite 100 are shown in FIGS. 2A, 2B, and 2C. Integration suite 100 is based on a distributed architecture, which allows the platform to grow. For example, two integration servers 102 and a broker 104 with users physically segregated from the integration suite 100 platform and its associated servers are shown in FIG. 2A. In this diagram, only the left most integration server 102 has an interface to external users, the broker 104 and right most integration server 102 are on a protected LAN.

In FIG. 2B, two integration servers 102 and a broker 104 with users of the integration suite 100 and its associated servers are procedurally segregated (e.g., through encryption or trust). In this configuration, the broker 104 and both integration servers 102 are externally visible, and the IT environment would have to protect network connections.

Finally, two integration servers 102 and a broker 104 running procedurally segregated users from behind a VPN are shown in FIG. 2C. The integration suite 100 shown in this diagram is accessed through a firewall and reverse invoke server, and may not be directly connected to by external users.

Figure 3:
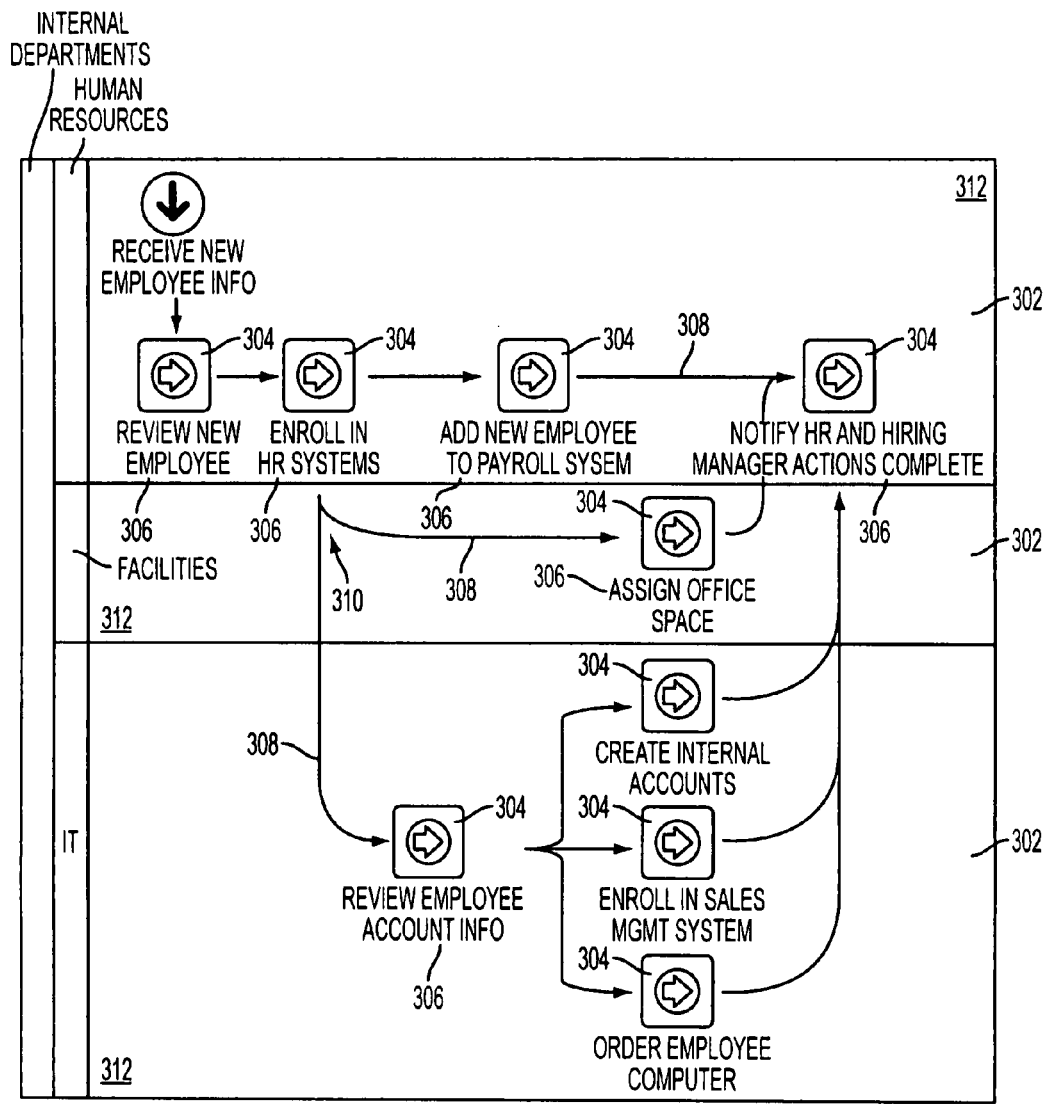
FIG. 3 illustrates a graphical user interface depicting a pool, swimlanes, processes, and tasks for use in the business process management system of FIG. 1.

Referring now to FIG. 3, there is shown one example of a process diagram which captures the activities that are performed by an organization. Process models and diagrams consist of the following elements.

Processes 302 are representations of real-time business processes. Processes are composed of individual steps 304 or activities, the conditions that dictate when these steps and activities occur, and the resources required for the performance or execution of the process. Explanatory notes, also known as annotations 306, may also be added anywhere in a process diagram. A connection 308 is a link between two steps 304.

A decision (not shown) may route inputs to one of several alternative outgoing paths. One may think of a decision as a question that determines the exact set of activities during the execution of a process. Questions might include: "What type of order?", "How will the order be shipped?", and "How will the customer pay?"

A fork 310 makes copies of its inputs and forwards them by several processing paths. Use of a fork may be done when one wants to perform two or more tasks in parallel.

An input is an entry point through which an element (such as a process or task) is notified that it can start, typically because an upstream element, on which it depends, has finished running. An element starts once it has all of its required inputs. The inputs also define the data that the element needs before it can run.

Key performance indicators (often referred to as KPI) are measures designed to track the critical success factors of a product or business. Over time, these measures can be used to determine overall efficiency. Within integration suite 100, one may add KPIs to processes to document the critical factors you intend to track for those processes.

A start node identifies the beginning of a process flow that is not associated with data. Conversely, a stop node marks the end of a process. Every process, subprocess, and loop must have at least one stop node. When a flow reaches a stop node while the process is running, the process immediately terminates, even if there are other currently executing flows within the process.

Swimlanes 312 are visually separated rows within a process diagram that group activities by resource definitions, roles, classifiers, organization units, or locations. Tasks are the basic building blocks representing activities in a process model. Each task performs some function. Visually, a task represents the lowest level of work you can portray in a process.

As noted briefly herein above, KPIs (or "Key Performance Indicators") are quantifiable measurements that reflect critical success factors of a company, department, or project. In the integration suite 100 according to embodiments of the present invention, KPIs are defined by dimensions, facts, and hierarchies. A KPI is related to a hierarchy, which is related to a group of dimensions, which is related to a fact.

For example, a KPI might be comprised of:

Order Total (fact) per customer (dimension) per region (dimension)

Dimensions

A dimension is a string field that is used to categorize data in order to enable users to answer business questions. Commonly used dimensions are customer, product, promotion, channel, and time. For example, each sales channel of a clothing retailer might gather and store data regarding sales and reclamations of their clothing assortment. The retail chain management can analyze the sales of its products across all stores over time and help answer questions such as:

What is the effect of promoting one product on the sale of a related product that is not promoted?

What are the sales of a product before and after a promotion?

How does a promotion affect the various distribution channels?

Defining Dimensions

Once one has defined a KPI, one defines dimensions to associate with it. In a given process, a dimension can be used only once. To define a dimension according to embodiments of the present invention:

1. On the design canvas, click to select a step.
2. Click the KPIs page in the Properties view.
3. In the KPIs for <step name> section, click to select a KPI.
4. In the Dimensions section, click Add Dimension.
5. In the Add Dimension window, enter a Dimension Label.
6. Click [...] Add Association to browse for an Associated Field for the new dimension.
7. In the Choose Field window, click the output field with which you want to associate the dimension, and then click OK.

Although one may select a KPI when one defines a dimension, one may use any dimension with any KPI. It should be noted, however, that dimension labels in certain circumstances must be unique on a given server (e.g., with the webMethods Optimize server). With webMethods Designer Version 7.0, Service Pack 2, one cannot, at design time, detect all the KPI names and dimension labels on the target server. However, if one duplicates a KPI name or dimension label in a process, generation of the process produces a warning. It should be noted at this juncture that when one associates an output field with a KPI or a dimension, Designer automatically adds the field to the Logged Fields page in the Properties view.

Designer does not, however, automatically remove an output field from the Logged Fields page in the Properties view if one removes it from a KPI or dimension. Further information regarding Designer and the definition of dimensions may be found in *webMethods Optimize for Process User's Guide*, Version 7.0, Service Pack 2 (April 2007), *webMethods Optimize for Process Administrator's Guide*, Version 7.0, Service Pack 2 (April 2007), *webMethods Optimize Central Configuration and Deployment Guide*, Version 7.0 (April 2007), and *webMethods Installation Guide*, FABRIC 7 (May 2007), each of which is incorporated herein by reference.

Deleting Dimensions

One may delete dimensions one has defined. Deleting a dimension removes it from all KPIs that use it.

To delete a dimension:

1. On the design canvas, click to select a step.
2. Click the KPIs page in the Properties view.
3. In the KPIs for <step name> section, click to select a KPI.
4. In the Dimensions section, click the Description field of a dimension to select it.
5. Click Delete Dimension.

Removing Associated Fields from Dimensions

One may remove a dimension's associated field. A dimension without an associated field cannot be used in a KPI.

To remove an associated field from a dimension:

1. On the design canvas, click to select a step.
2. Click the KPIs page in the Properties view.
3. In the KPIs for <step name> section, click to select a KPI.
4. In the Dimensions section, click [x] Remove Association next to an Associated Field to remove that associated field.

It should be noted that, when one removes an association of an output field from a dimension or a KPI, Designer does not remove the field from the Logged Fields page in the Properties view.

Process-Level KPIs

Process-level KPIs apply to the process as a whole. Designer includes the following predefined process-level KPIs on the Auto Generated tab of the KPIs page in the Properties view of a process:

Volume
Cycle Time
Error Count

For each of these, Name is automatically populated and read-only. One may enter a Description for documentation purposes. The other fields displayed are not available for process-level KPIs.

Step-Level KPIs

Step-level KPIs apply to a step in a process. One may define as many step-level KPIs as desired for a given step. KPIs cannot be reused in multiple steps; each step has its own KPIs.

One may view the KPIs included in an open process by using the Outline view. Click a KPI nested under a step and click it. The step that contains the KPI is highlighted on the design canvas.

Defining Step-Level KPIs

To define a step-level KPI

1. On the design canvas, click a step for which you want to define a step-level KPI.
2. Click the KPIs page in the Properties view.
3. On the Business KPIs tab in the KPIs for <step name> section, click to select a KPI.
4. Click Add KPI.
5. In the Add KPI window, enter a Label for Business KPI, and click OK.
6. With the KPI selected, define the following properties for it:

| Property | Description |
| --- | --- |
| Name | Name of the KPI<br>Note: KPI names must be unique on a given Optimize server. Designer cannot, at design time, detect all the KPI names and dimension labels on the target server. However, if one duplicates a KPI name or dimension label in a process, generation of the process produces a warning. |
| Description | Description of the KPI |
| Unit of Measure | How the KPI is measured |
| Associated Field | Associate the KPI with actual fields in the process. Only fields that are available in the output of the step can be used.<br>Note: When you associate an output field with a KPI or a dimension, Designer automatically adds the field to the Logged Fields page in the Properties view. Designer does not, however, automatically remove an output field from the Logged Fields page in the Properties view if you remove it from a KPI or dimension. |
| Aggregation Type | Aggregation type can be set to SUM, AVERAGE, or LAST VALUE |

7. Add dimensions for the KPI (see "Defining Dimensions") or check the boxes corresponding to existing dimensions. A dimension must have an associated field to be used in a KPI.

Modifying Step-Level KPIs

Modifying a step-level KPI involves editing its on the KPI page in the Properties view of the step. One may edit fields, add new dimensions, delete existing dimensions, and change the dimensions used to measure the KPI.

Deleting Step-Level KPIs

To delete a step-level KPI

1. On the design canvas, click a step that has a step-level KPI you want to delete.
2. Click the KPIs page in the Properties view.
3. On the Business KPIs tab in the KPIs for <step name> section, click to select a KPI.
4. Click Delete KPI.

Removing Dimensions from Step-Level KPIs

To remove dimensions from a step-level KPI

1. On the design canvas, click a step that has a step-level KPI.
2. Click the KPIs page in the Properties view.
3. On the Business KPIs tab in the KPIs for <step name> section, click to select the KPI with a dimension you want to remove.
4. In the Dimensions section, clear the check box that corresponds with the dimension you no longer want to associate with the KPI.

It should be noted that when one removes an association of an output field from a dimension or a KPI, Designer does not remove the field from the Logged Fields page in the Properties view.

Uploading KPIs to Optimize

One may upload KPIs to Optimize when you build and upload a process for execution. One may also upload KPIs explicitly, without building an uploading the process for execution.

Set the default Designer behavior for KPI upload behavior in Build and Upload preferences. Configure the Optimize server to which you want to upload KPIs in Optimize Server preferences.

When one uploads KPIs from Designer to Optimize, you overwrite all KPIs for that process that have already been uploaded. The exception to this is KPIs that have been edited using My webMethods Server. If one wants to upload KPIs for a process whose KPIs have been edited in My webMethods Server, one must first use My webMethods Server to delete the KPIs. Once this has been done, one may upload KPIs for the process from Designer again.

It should be noted at this juncture that KPI names and dimension labels must be unique on a given Optimize server. Designer cannot, at design time, detect all the KPI names and dimension labels on the target server. However, if one duplicates a KPI name or dimension label in a process, Designer warns of this when you upload KPIs, whether when building and uploading a process for execution, or when uploading KPIs explicitly (without building and uploading a process for execution).

To upload KPIs to Optimize when building and uploading a process for execution

1. Configure an Optimize server in Optimize Server preferences.
2. Configure the Automatically Upload KPIs on Build option in Build and Upload preferences to either Always (to avoid a prompt) or Prompt (if desired). The default setting is Prompt.
3. If One is not in the Process Developer or Process Debugger perspective, switch to one of them.
4. Open a process that contains KPIs.
5. File > Build and upload for execution or click Build and upload for execution on the main toolbar.

To upload KPIs to Optimize explicitly (without building and uploading a process for execution)

1. Configure an Optimize server in Optimize Server preferences.
2. Configure the Prompt to Upload KPIs option in Build and Upload preferences to either Never (if you don't want a prompt) or Always (if you do). The default setting is Always.
3. If you are not in the Process Developer or Process Debugger perspective, switch to one of them.
4. Open a process that contains KPIs.
5. File > Upload KPIs or click Upload KPIs on the main toolbar.

Build and Upload Preferences

One may configure the following Build and Upload preferences:

| Preference | Description |
| --- | --- |
| Save Before Building Process | Choose Always, Never, or Prompt. Default is Prompt. |
| Automatically Build Referenced Processes when Building Parent Process | Choose Always, Never, or Prompt. Default is Prompt. |
| Automatically Deploy Task to Task Engine | Choose Always, Never, or Prompt. Default is Prompt. |
| Automatically Upload KPIs On Build | Choose Always, Never, or Prompt. Default is Always. |
| Prompt to Upload KPIs | For Upload KPIs menu and toolbar button actions. Does not apply to uploading KPIs with a build. Choose Always or Never. Default is Always. |
| Display stack traces in Build Report when encountering exceptions | Check the box to enable. Enabled by default. |
| Stack Trace Line Limit | Maximum number of stack trace lines included in the Build Report view when encountering exceptions. This value is used only when Display stack traces in Build Report when encountering exceptions is enabled. The default value is 10. |

Optimize Server Preferences

In order to upload KPIs, one must specify an Optimize Server. One may configure the following Optimize Server preferences:

| Preference | Description |
| --- | --- |
| Broker Host Name | Broker host name. Default value is localhost. |
| Broker Host Port | Broker host port. Default value is 6849. |
| JMS Provider Broker Name | JMS provider broker name. Default value is Broker #1. |
| Timeout (seconds) | Enter the number of seconds Designer should wait for a connection to the Optimize Server. A value of −1 means never time out. The default value is 60. |
| Test Connection | Click to test the connection to the defined Optimize Server. |

Hierarchies are groups of dimensions that show relationships among different dimensions. For example, a customer (dimension) is part of a region (dimension).

Facts are integer fields or decimal fields that contains data such as sales (units sold) and profits. For example, an Order Total is a fact. KPIs compare facts with dimensions.

In Designer, one may:
define step-level KPIs
define dimensions for step-level and process-level KPIs
assign dimensions to process-level and step-level KPIs
remove dimensions from KPIs
delete dimensions
upload KPIs when you build and upload a process for execution
upload KPIs explicitly (without building and uploading a process for execution)
configure preferences for uploading KPIs
configure Optimize Server preferences for uploading KPIs Step Inputs and Outputs Each step in a process has information that flows into and out of it. Information flowing into a step is called input, and information flowing out of a step is called output.

Process data assigned in Designer to flow in and out of steps needs to be mapped to physical data that the underlying services require in order for the process to execute.

Step inputs and outputs are used to define flow signatures, branching and looping logic in the process, data logging for examination at run time, and KPIs.

Step inputs and outputs are used to generate the signatures for the generated services that implement the process. If the underlying implementation of the step requires different physical data than this process data, the data must be mapped in the generated flows.

Process data follows a pipeline model, where all data that is input to a step must be output upstream in the process from that step.

Data can therefore enter the process in two ways:
In a receive step, a subscription document can trigger or join the process, and output data for that step and into the pipeline
In an activity step, the step can output new process data into the pipeline While one may add new inputs to any step, the process will not be valid (e.g., ready to be built) until all step inputs are first selected as outputs of an upstream receive or activity step.

Designer can automatically map step inputs and outputs in the following circumstances:
Step A is linked to step B, and the output of step A has the same name as the input of step B
An activity step input name is the same as the document or service input name
A receive step output document is the same type as the subscription to the step In all but these cases, one must launch webMethods Developer and explicitly map the data. One may launch Developer from Designer using the  Launch webMethods Developer button on the toolbar, or right click a step and click  Launch Developer.

If the inputs or outputs of a task, service, or rule used to implement that step are changed such that they do not match what is on the design canvas, the process will not refresh its inputs and outputs automatically. One must explicitly refresh them by editing the inputs or outputs on the step's Inputs/Outputs page in the Properties view. Remove the old inputs or outputs from the step, and use the  Auto-populate based on service signature button to assign the new inputs or outputs.

It is important to note at this juncture that Designer does not support String Tables, Documents, Document Lists, or Document Reference Lists. If one drags a service from the Metadata Library or an IS Browser, and the service has any inputs or outputs that are not supported by Designer, those fields will appear as Unknown types in the inputs or outputs of the step. Unknown field types in generated Designer steps appear in webMethods Developer as unspecified Objects, and you can change their types there.

Logical Servers Preferences

One defines logical servers to represent physical servers in your process, and assign simpler names to them. This allows one to assign logical servers to assets in a process, and then later to change the physical server assigned to the logical server (such as when moving from a test to a production environment) without having to reassign assets to different servers.

One may have multiple logical servers assigned to the same physical server. This is helpful at design time if one only has one Integration Server available. When one moves to a production environment, one may reassign the logical servers to different physical servers to support the generated, executable process.

Logical servers are saved per workspace, and one may import and export their properties using a properties file, allowing for easy sharing of logical/physical server maps.

When one creates a logical server, Designer automatically creates an IS Data Provider with the same name.

By default, one logical server exists in a new Designer installation. It is named Default, and configured to be at localhost:5555. One may edit the configuration to use another host and port, and you can edit the name. One must enter your authentication credentials in order to validate the logical server before you can use it.

It should be noted, however, that if one assigns Default Logical Server status to a different logical server, that server will be used as the default when one creates new steps. Existing steps remain assigned to their associated logical servers.

Moreover, if one uses multiple Integration Servers at design time, and publishes metadata from those Integration Servers to the Metadata Library, one should ensure that you assign each Logical Server a Logical Host Name that matches the IS Host Name assigned in the WmAssetPublisher package on that Integration Server. This ensures that steps created with assets dragged and dropped from the Metadata Library are configured with the correct Logical Server.

If the Logical Host Name and IS Host Name do not match, dragging and dropping an asset from the Metadata Library either creates a new Logical Server with the IS Host Name, or reuses an existing Logical Server that is pointing to an incorrect physical server.

The default IS Host Name in the WmAssetPublisher package is the name of the Integration Server where the package is located.

| Option | Description |
|---|---|
| Logical Host Name | Server name. Does not have to match HTTP host name. |
| Host Name or IP Address | HTTP host name or IP address of the server. |
| Port | Port used to access the server. |
| Default | Check box indicating this is the default logical server for the workspace. Only one default logical server is allowed per workspace; assigning a new default logical server removes an existing default designation. |
| Status | Status of connection and date/time of last connection check. |
| Offline | Check the box if not connected to the logical server and do not want Designer to prompt to log into it. When one is not in Offline mode, Designer prompts one to log into an Integration Server (IS) when one browses for an IS service or document, when one selects fields for transitions and custom logging. The first time one is prompted to log into an Integration Server (IS), one may check the Work Offline box. This sets the Offline status for that IS in the Logical Servers preferences. |

Figure 4:
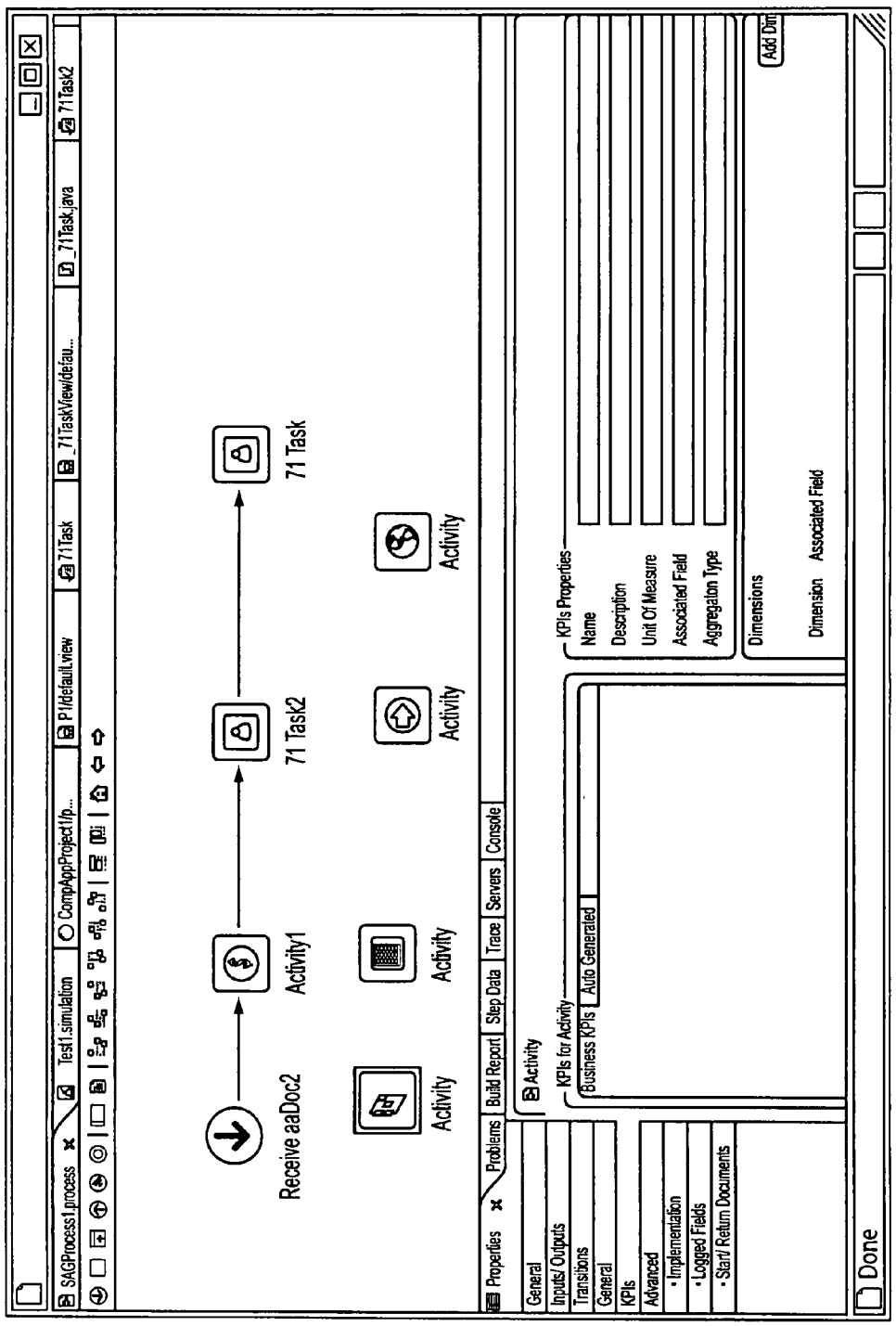
FIG. 4 illustrates a graphical user interface comprising a canvas according to the present invention.

FIG. 4 illustrates a user interface according to an exemplary embodiment of the invention. The user interface may be used to design a business process as well as a key performance indicator for the process or steps in the process.

KPIs (Key Performance Indicators) are quantifiable measurements that reflect critical success factors of a company, department, or project. KPIs may be defined by dimensions, facts, and hierarchies. A KPI may be related to a hierarchy, which may be related to a group of dimensions, which may be related to a fact.

The user interface as depicted includes two main areas, a drawing canvas and information window. The business process may be design by dragging and dropping icons onto the drawing canvas as is known in the art. The business process may be formed by a number of steps. For example, for the process shown in FIG. 4, the process includes steps Activity1, 7Task2, 71Task. The process and the relationships between the steps may be defined without a user, such as a business analyst having to code anything.

As the business analysts is designing the process, KPIs for the process or for steps in the process may also be defined. This differs from prior system which required KPIs to be defined at runtime or required special coding. In embodiments of the invention, the KPIs may be defined as part of the design procedure of forming the process. Once defined, the definitions of the KPIs may be included in deployable units and provided to a runtime environment.

In an exemplary process of defining a KPI, a user may click on a step in the design canvas for the step for which it is desired to define a KPI. In this example, Activity is selected. In the "Properties" view in the information window, click on the "KPI" page. The information shown in window may then be displayed. An option to add a KPI to Activity may be shown and should be selected to add a KPI. Next, the various properties for the KPI should be defined. The name filed is for the name of the KPI. KPI names should be unique. The description field is for a description of the KPI. The unit of measure field is for a unit of measure for the KPI. The associated filed is for the associated field for the KPI. The associated filed may be used to associate the KPI with actual data fields in the process. Only data fields that are available in the output of the step of the process should be used. When a user associates a data field with a KPI or a dimension, described below, the filed may be automatically added to the logged fields page in the properties page. The data may then be automatically tracked as the process is performed so the data may be used to determine the KPI. For example, the data may be obtained form any data source. The aggregation type field may be used for aggregation type, such as, for example, sum, average, or last value. Dimensions for the KPI may also be defined, as is described below.

In exemplary embodiments of the invention, a dimension may be added in a similar manner as to how a KPI is defined as described above. On the design canvas, a step may be clicked to select that step. The KPIs page in the Properties view may the be selected along with the particular KPI to which the dimension is being added. The option to add a KPI may then be selected. A field for adding a dimension label may be presented and the appropriate dimension label or name added. Dimension labels my be unique. An associated field for the dimension may also be defined. The associated field is the output of the step which is to be associated with the dimension. An add association button may provide for this.

Once the KPI is defined, a deployable unit including the definition for the KPI may be created. The deployable unit may be provided to a runtime environment and executed. For example, the deployable unit may be created and provided to the runtime environment with a single click. The system will create and transfer the deployable unit to the runtime environment, for example via HTTP. The runtime environment may be a remote computer. The deployable unit may include, for example, an XML document including the definition of the KPI. The XML document may include the definition for one or more of the KPIs. The XML document may be provided to a runtime environment on a computer for execution. Execution of the deployable unit may result in a report based on the KPI and business process being generated. One or more reports may be generated.

Although this invention has been described in certain specific embodiments, many additional modifications and variations would be apparent to those skilled in the art. It is, therefore, to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description. The invention, therefore, as defined in the appended claims, is intended to cover all such changes and modifications as fall within the true spirit of the invention.

What we claim as our invention is:

1. A computer based system for generating at least one key performance indicator (KPI) while creating a business process, the system comprising:

a communication network;

one or more user devices connected to the communication network, the user devices including displays;

a database connected to the communication network;
an interface for receiving business data from one or more business operating systems for storage in the database;
a design module for creating the business process through a design procedure comprising a plurality of steps, the design module adapted to:
  receive user input from a user at the user device during each of the steps of the design procedure, wherein the system at each of the plurality of steps automatically uploads the KPI related to the business process such that the KPI is selected at the same time the business process is created in the design module,
  create a plurality of links to business data based on the KPI; and
  create a deployable unit based on the business process and the KPI;
a first integration server connected to the communication network to receive and to execute the deployable unit in a runtime environment to obtain a report and to present the report via the display; and
one or more brokers configured to route the deployable unit to and from the integration server.

2. The system of claim 1, further comprising storing the report.

3. The system of claim 1, wherein the business process includes a plurality of steps.

4. The system of claim 1, wherein the KPI applies to one of the steps of the business process.

5. The system of claim 1, wherein a plurality of KPIs apply to at least one of the steps of the design procedure of the business process.

6. The system of claim 1, wherein the design procedure includes fields for entering properties of the KPI.

7. The system of claim 6, wherein the properties include at least one of a name, a description, a unit of measure, associated field, and aggregation type.

8. The system of claim 7, wherein the aggregation type is one of sum, average of last value.

9. The system of claim 6, wherein the design procedure includes a field for receiving dimension information.

10. The system of claim 9, further comprising associating the dimension information with an output field of the step.

11. The system of claim 9, wherein the deployable unit comprises an XML document including a definition of the KPI.

12. The system of claim 11, wherein the definition includes the properties and dimensions of the KPI.

13. A method for defining at least one key performance indicator (KPI) while creating a business process, comprising:
  presenting, through at least one processor, a design procedure comprising a plurality of steps to a user through a user interface to facilitate creation of the business process;
  receiving, through the at least one processor, user input during each of the plurality of steps of the design procedure via the user interface to create the business process to be monitored;
  presenting, through the at least one processor, a user interface to the user at each of the plurality of steps of the design procedure;
  receiving, through at least one processor, user input via the user interface during each of the plurality of steps of the design procedure of the business process, wherein the processor at each of the plurality of steps automatically uploads the KPI such that the KPI is selected at the same time the business process is created;
  creating, through the at least one processor, a deployable unit based on the KPI and the business process;
  routing, through the at least one processor, with one or more brokers the deployable unit to an integration server; and
  executing, through the at least one processor, the deployable unit with the integration server in a runtime environment to produce a report regarding the KPI.

14. The method of claim 13, wherein the business process includes a plurality of steps of the business process.

15. The method of claim 14, wherein the KPI applies to one of the steps of the business process.

16. The method of claim 14, wherein a plurality of KPIs apply to one of the steps of the business process.

17. The method of claim 13, further comprising presenting the report to the user via a display.

18. The method of claim 13, further comprising linking the KPI to data fields.

19. The method of claim 13, wherein the deployable unit with the processor also obtains data from a data source based on the KPI.

20. The method of claim 13, wherein the design procedure includes fields for entering properties of the KPI.

21. The method of claim 20, wherein the properties include at least one of a name, a description, a unit of measure, associated field, and aggregation type.

22. The method of claim 21, wherein the aggregation type is one of sum, average of last value.

23. The method of claim 20, wherein the design procedure includes a field for receiving dimension information.

24. The method of claim 23, further comprising associating the dimension information with an output field on the step.

25. The method of claim 13, wherein creating the deployable unit includes creating an XML document including a definition of the KPI and providing the XML document to a run-time environment of the processor.

26. A non-transitory computer readable storage medium storing computer readable program code for causing a computer to perform steps of:
  presenting a design procedure comprising a plurality of steps to a user through a user interface to facilitate creation of a business process to be monitored;
  receiving user input during each of the plurality of steps of the design procedure via the user interface to create the business process to be monitored;
  presenting a user interface to the user at each of the plurality of steps as part of the design procedure of the business process;
  receiving user input via the user interface during each of the plurality of steps of the design procedure of the business process, wherein a key performance indicator (KPI) is automatically uploaded at each of the plurality of steps such that the KPI is selected at the same time the business process is created during the design procedure;
  creating a deployable unit based on the KPI and the business process;
  routing with one or more brokers the deployable unit to an integration server; and
  executing the deployable unit with the integration server in a runtime environment to produce a report regarding the KPI.

27. The system of claim 1, further comprising a second integration server, wherein the first and second integration servers and the broker are physically or procedurally segregated from the user device.

28. The system of claim 27, wherein the first integration server and broker are on a protected local area network and the second integration server has an interface to communicate with the user device.

29. The system of claim 1, wherein the integration server is a logical server representing a physical server and is assigned an identifying name so that the logical server may be assigned to assets in the business process and later changed to the physical server.

* * * * *